United States Patent [19]

Harashige et al.

[11] Patent Number: 5,317,051
[45] Date of Patent: May 31, 1994

[54] SURFACE WHITENING PREVENTING FLAME-RETARDANT OLEFIN POLYMER COMPOSITION

[75] Inventors: Masahiro Harashige, Tokyo; Tsutomu Kawamura, Yokohama; Satoru Kaneko, Yokohama; Takashi Inoue, Yokohama; Atsuo Tokutake, Yokohama; Toshitsune Yoshikawa, Kawasaki, all of Japan

[73] Assignee: Nippon Petrochemicals Co., Ltd., Tokyo, Japan

[21] Appl. No.: 890,360

[22] PCT Filed: Aug. 22, 1989

[86] PCT No.: PCT/JP89/00853
§ 371 Date: Apr. 9, 1990
§ 102(e) Date: Apr. 9, 1990

[87] PCT Pub. No.: WO90/02153
PCT Pub. Date: Mar. 8, 1990

Related U.S. Application Data

[63] Continuation of Ser. No. 477,874, Apr. 9, 1990, abandoned.

[30] Foreign Application Priority Data

Aug. 22, 1988 [JP] Japan ................. 63-206337
Aug. 22, 1988 [JP] Japan ................. 63-320427

[51] Int. Cl.$^5$ ............................... C08K 5/10
[52] U.S. Cl. ..................... 524/310; 524/312; 524/315; 524/398; 524/399; 524/400; 524/436; 524/437; 524/520; 524/523; 524/524; 524/529; 524/536
[58] Field of Search ............. 524/436, 437, 310, 312, 524/315, 398, 399, 400, 520, 523, 524, 529, 536

[56] References Cited

U.S. PATENT DOCUMENTS 4,845,146 7/1989 Inoue et al. ............. 524/437
4,851,463 7/1989 Opsahl et al. ............. 524/437

FOREIGN PATENT DOCUMENTS 61-183332 8/1986 Japan .
61-296045 12/1986 Japan .
62-225541 10/1987 Japan .
62-235343 10/1987 Japan .

Primary Examiner—John C. Bleutge
Assistant Examiner—Mark Sweet
Attorney, Agent, or Firm—Dilworth & Barrese

[57] ABSTRACT

A flame-retardant olefin polymer composition superior in surface whitening preventing property is obtained by blending 100 parts by weight of a resin component consisting principally of:
  a) 99–60% by weight of a polyolefin resin and
  b) 1–40% by weight of an olefin polymer modified with an unsaturated carboxylic acid or a derivative thereof: with
  c) 5–200 parts by weight of a flame retardant: and
  d) at least one component selected from the group consisting of:
    ① a mineral oil, a wax, or a paraffin.
    ② a higher fatty acid or an ester, amide or metallic salt thereof,
    ③ a silicone
    ④ a partial fatty ester of a polyhydric alcohol or aliphatic alcohol-, fatty acid-, aliphatic amino-, fatty acid amide-, alkylphenol- or alkylnaphthol-ethylene oxide adduct, and
    ⑤ a fluoric elastomer.

14 Claims, No Drawings

SURFACE WHITENING PREVENTING FLAME-RETARDANT OLEFIN POLYMER COMPOSITION

This is a continuation of copending application Ser. No. 07/477,874 filed on Apr. 9, 1990, now abandoned.

INDUSTRIAL UTILIZATION FIELD

The present invention relates to a flame-retardant olefin polymer composition capable of affording a molded product superior in mechanical strength, heat resistance and surface whitening preventing property, the said olefin polymer composition consisting principally of a polyolefin, particularly at least one ethylene copolymer selected from the group consisting of ethylene-α-olefin copolymer, copolymers of ethylene and unsaturated carboxylic acids or esters or metallic salts thereof and ethylene-vinyl ester copolymers, and an olefin polymer modified with an unsaturated carboxylic acid or a derivative thereof.

PRIOR ART

Polyethylenes are general-purpose resins greatest demand which are superior in physical and chemical properties, so are formed into films, sheets, pipes, containers, etc. by various methods, including extrusion, injection molding and rotational molding, and are applied to various domestic and industrial uses.

Since such polyethylenes are easy to burn, various methods have heretofore been proposed for rendering them flame-retardant. Among them, the most general method is to add a flame retardant containing halogen or phosphorus to the polyethylenes.

However, although the addition of a small amount of such flame retardant is effective, there is the drawback that a noxious gas is evolved during combustion.

Recently, as low-smoking and pollution-free flame retardants which do not evolve a noxious gas during combustion, inorganic flame retardants such as a aluminum hydroxide and magnesium hydroxide have met such needs and are rapidly increasing in demand. (Related techniques are disclosed, for example, in Japanese Patent Laid Open Nos.132254/1976 136832/1981.)

In the conventional commercial polyethylenes, the acceptability of particularly inorganic flame retardants is poor and the flame retarding effect thereof is low. Besides, with increase in the amount of loading, the mechanical strength as well as flexibility and processability deteriorate to an impractical extent.

Further, when the conventional polyethylenes containing such inorganic flame retardants as electric wires or cables, their surfaces are flawed, causing whitening, during laying or use thereof.

PROBLEMS TO BE SOLVED BY THE INVENTION

According to the present invention, in view of the above-mentioned points, there is provided a flame-retardant polyolefin resin composition superior in mechanical strength, heat resistance, processability and flame retardance, having a remarkable resistance to whitening and also having an improved acid resistance. This composition can be applied to various uses, including electric wires, cables, packages, sealing materials, hoses, films, molded products, e.g. injection-molded products, and master batches.

MEANS FOR SOLVING THE PROBLEMS

The present invention resides in a flame-retardant olefin polymer resin composition comprising:

100 parts by weight of a resin component consisting principally of:
a) 99–60 wt % of a polyolefin resin and
b) 1–40 wt % of an olefin polymer modified with an unsaturated carboxylic acid or a derivative thereof;
c) 5–200 parts by weight of a flame retardant; and
d) 0.05–20 parts by weight of at least one component (a whitening preventing agent) selected from the group consisting of:
  ① a mineral oil a waxes, or a paraffin,
  ② a higher fatty acid or an ester, amide or metallic salt thereof,
  ③ a silicone,
  ④ a partial fatty acid ester of a polyhydric alcohol or aliphatic alcohol-, fatty acid-, aliphatic amino-, fatty acid amide-, alkylphenol- or alkylnaphthol-alkylene oxide adduct, and
  ⑤ a fluoric elastomer.

Example of the polyolefin resin used as component a) in the present invention include homopolymers and copolymers of α-olefins such as ethylene, propylene, 1-butene, 1-hexene, 4-methyl-1-pentene and 1-decene, copolymers of ethylene with unsaturated carboxylic acids or esters or metallic salts thereof, and ethylene-vinyl ester copolymers, e.g. an ethylene-vinyl acetate copolymer. Particularly copolymers of ethylene with unsaturated carboxylic acids or esters or metallic salts thereof, ethylene-vinyl ester copolymers, and ethylene-α-olefin copolymers ranging in density from 0.86 to 0.91 g/cm$^3$ are preferred.

As examples of the above unsaturated carboxylic acids or esters thereof and vinyl esters there are mentioned unsaturated carboxylic acids such as acrylic acids, methacrylic acid, maleic acid, fumaric acid, maleic anhydride and itaconic anhydride; unsaturated carboxylic ester monomers such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, maleic acid monomethyl ester, maleic acid monoethyl ester, maleic acid diethyl ester, furamic acid monomethyl ester, glycidyl acrylate, and glycidyl methacrylate; and vinyl ester monomers such as vinyl propionate, vinyl acetate, vinyl caproate, vinyl laurylate, vinyl stearate, and vinyl trifluoroacetate.

Particularly preferred are (meth)acrylic acid alkyl esters and vinyl esters, and still more preferred are ethyl acrylate and vinyl acetate. The exemplified monomers may be used as mixtures.

As concrete examples of the above copolymers there are mentioned ethylene-acrylic acid copolymer, ethylene-methacrylic acid copolymer, ethylene-ethyl acrylate copolymer, ethylene-ethyl methacrylate copolymer, ethylene-vinyl acetate copolymer, ethylene-glycidyl methacrylate copolymer, ethylene-acrylic acid-ethyl acrylate copolymer, ethylene-vinyl acetate-ethyl acrylate copolymer, ethylene-glycidyl methacrylate-ethyl acrylate copolymer, and metallic salts (ionomers) thereof. These copolymers may be used as mixtures.

The above copolymers are in the range of 0.1 to 50 g/10 min., preferably 0.3 to 20 g/10 min., in terms of melt flow rate (hereinafter referred to simply as "MFR"). A value of MFR smaller than 0.1 g/10-min. will result in poor processability, and if the value thereof exceeds 50 g/10 min., a deteriorated mechanical strength will result. So both such values are not preferred.

As the olefin polymer modified with an unsaturated carboxylic acid or a derivative thereof, which is used as component b) in the present invention, there is used a modified olefin polymer obtained by modifying an olefin polymer with 0.05 to 10 wt % of an unsaturated carboxylic acid or a derivative thereof in the presence of an organic, peroxide, or a mixture thereof with an unmodified olefin polymer.

As examples of the olefin polymer there are mentioned olefin homopolymers such as polyethylene, polypropylene, poly-1-butene and poly-4-methyl-1-pentene; copolymers of ethylene, propylene, 1-butene, 4-methyl-1-pentene, 1-hexene and 1-octene with each other; copolymers of ethylene with vinyl esters, unsaturated carboxylic acids, or unsaturated carboxylic esters; and mixtures thereof. Particularly, polyethylenes, polypropylenes and ethylene-α-olefin copolymers, e.g. ethylene-butene-1 copolymer, are preferred. More preferred are ethylene homopolymer and ethylene-α-olefin copolymers ranging in density from 0.86 to 0.97 g/cm$^3$, and mixtures thereof.

In the present invention, together with the olefin polymers exemplified above there may be used synthetic rubbers, for example, such solid rubbers as polyisobutylene, butyl rubber, ethylene-propylene rubber, ethylene-propylene-diene rubber polybutadiene rubber, chloroprene rubber, urethane rubber and ethylene-vinyl acetate copolymer rubber, or such liquid rubber as liquid polybutadiene rubber, as well as natural rubbers, and mixtures thereof.

On the other hand, as examples of the unsaturated carboxylic acid derivative thereof for modification of the olefin polymer there are mentioned mono- and dibasic acids such as acrylic, methacrylic, maleic and fumaric acids, as well as metallic salts, amides, imides, esters and anhydrides of the unsaturated carboxylic acids just exemplified, with maleic anhydride being most preferred.

According to a preferred method for modifying the olefin polymer with the unsaturated carboxylic acid or derivative thereof, both are heat-reacted in the presence of an organic peroxide.

How to perform the above reaction is not specially limited. For example, the reaction may be conducted by melt-mixing the components in the absence of a solvent within an extruder or a kneader such as a Banbury mixer, or it may be conducted by heat-mixing the components in a solvent such as an aromatic hydrocarbon, e.g. benzene, xylene or toluene, or an aliphatic hydrocarbon such as hexane, heptane or octane. Preferably, the reaction is carried out within an extruder because of simple operation and superior economy.

The unsaturated carboxylic acid or derivative thereof is used in an amount in the range of 0.05 to 10 wt %, preferably 0.1 to 5.0 wt %. If the amount thereof is smaller than 0.05 wt %, the present invention will be less effective and a coupling effect of the resin and the flame retardant will not be exhibited. On the other hand, if its amount exceeds 10 wt %, it is possible that decomposition and crosslinking reaction will take place at the time of modification.

Suitable examples of the organic peroxide referred to above include benzoyl peroxide, lauryl peroxide, dicumyl peroxide, t-butyl hydroperoxide, α,α-bis(t-butylperoxydiisopropyl)benzene, di-t-butyl peroxide, 2,5-di(t-butylperoxy)hexyne, and azobisisobutyronitrile. The organic peroxide is used in an amount in the range of 0.005 to 2.0, preferably 0.01 to 1.0, part by weight per 100 parts by weight of the olefin polymer. If the amount of the organic peroxide used is less than 0.005 parts by weight, there will be no substantial effect of modification. And even if the organic peroxide is used in an amount exceeding 2 parts by weight, it is difficult to obtain a greater effect and there arises a likelihood of an excessive decomposition or crosslinking reaction.

A suitable reaction temperature is determined in consideration of usual temperature conditions such as the resin deteriorating temperature and the decomposition temperature of the unsaturated carboxylic acid and that of the organic peroxide. Generally, the reaction is carried out at a temperature in the range of 150° to 300° C.

The olefins polymer modified with the unsaturated carboxylic acid or derivative thereof may be further mixed with an unmodified olefin polymer and/or an unmodified rubber. The mixing ratio of the modified olefin polymer and the unmodified olefin polymer and/or unmodified rubber is not specially limited, but preferably it is in the range of 1:99 to 50:50, more preferably 10:90 to 45:55.

In the present invention, the amount of component b) is in the range of 1 to 40 wt %, preferably 10 to 25 wt %, relative to component a).

If the amount of component b) is less than 1 wt %, there will be little improvement in tensile strength, and if it exceeds 40 wt %, there will be a marked deterioration of elongation.

As the films retardant used as component c) in the present invention there may be used any of those which are generally considered to be effective. Examples are organic and inorganic flame retardants, such as halogen- and phosphorus-based flame retardants.

The following are illustrative of organic flame retardants.

As examples of halogen-based flame retardants there are mentioned bromine-based flame retardants such as tetrabromobisphenol (TBA), hexabromobenzene, decabromodiphenyl ether, tetrabromoethane (TBE), tetrabromobutane (TBB), and hexabromocyclodecane (HBCD); chlorine-based flame retardants such as chlorinated paraffin, chlorinated polyphenyl, chlorinated polyethylene, chlorinated diphenyl, perchlorophetacyclodecane, and chlorinated naphthalene; general halogen-based flame retardants such as halogenated diphenyl sulfides; halogenated polystyrenes and derivatives thereof, such as brominated polystyrene and brominated poly-α-methylstyrene; halogenated polycarbonates such as brominated polycarbonate; halogenated polyesters such as polyalkylenetetrabromoterephthalates and brominated terephthalic acid-based polyesters; halogenated epoxy compounds such as halogenated bisphenol type epoxy resins; halogenated polyphenylene oxide compounds such as poly(dibromophenylene oxide); and high molecular type halogen-containing polymers such as cyanuric esters of halogenated bisphenols.

As examples of phosphorus-based flame retardants there are mentioned phosphoric esters and halogenated phosphoric esters, such as tricresyl phosphate, tri(β-chloroethyl)phosphate, tri(dibromopropyl)phosphate, and 2,3-chloropropyl phosphate, phosphonic acid compounds and phosphinic acid derivatives.

Guanidine compounds such as guanidine nitride are also mentioned as examples of employable flame retardants.

The organic flame retardants exemplified above may be used each alone or in combination of two or more.

The organic flame retardants may be used in an amount in the range of 5 to 50, preferably 7 to 40, parts by weight for 100 parts by weight of the resin components a) and b). If the amount of organic flame retardant(s) used, is less than 5 parts by weight, there will not be obtained a satisfactory flame retarding effect, and even in an amount thereof exceeding 50 parts by weight, the flame retarding effect will not be improved any more, that is, an increase of cost will result. Thus, both such amount are undesirable.

The organic flame retardants exemplified above, especially halogen-based flame retardants, may be used together with flame retarding aids, whereby a synergistic effect can be developed. Typical examples of flame retarding aids antimony compounds such as antimony trioxide, antimony pentoxide, antimony halides, e.g. antimony trichloride and antimony pentachloride, antimony trisulfide, antimony pentasulfide, antimonic acid soda, antimony tartrate, and metallic antimony.

As examples of inorganic flame retardants there are mentioned hydrates of inorganic metallic compounds such as aluminum hydroxide, magnesium hydroxide, zirconium hydroxide, basic magnesium carbonate, dolomite, hydrotalcite, calcium hydroxide, barium hydroxide, hydrate of tin oxide, and borax, as well as zinc borate, zinc metaborate, barium metaborate, zinc carbonate, calcium magnesium carbonate, calcium carbonate, barium carbonate, magnesium oxide, molybdenum oxide, zirconium oxide, tin oxide, and red phosphorus.

The inorganic flame retardants exemplified above may be used each alone or in combination of two or more. Above all, at least one metallic compound hydrate selected from the group consisting of aluminum hydroxide, magnesium hydroxide, zirconium hydroxide, basic magnesium carbonate, dolomite and hydrotalcite is preferably employed, especially aluminum hydroxide and magnesium hydroxide, because of superior flame retarding effect and economical advantage.

The particle size of the inorganic flame retardants differ depending on the kind thereof, but in the case of aluminum hydroxide and magnesium hydroxide, an average particle diameter is 20 μm or smaller, preferably 10 μm of smaller.

The inorganic flame retardants exemplified above may be used in an amount in the range of 30 to 200, preferably 40 to 150, more preferably 50 to 120, parts by weight for 100 parts by weight of the resin components a) and b). It the amount of inorganic flame retardant(s) used is less than 30 parts by weight, it is necessary to use organic flame retardant(s) together with the inorganic flame retardant(s) because with latter alone it is difficult to attain a satisfactory flame retarding effect. On the other hand, an amount thereof exceeding 200 parts by weight will result in deteriorated mechanical strength such as deteriorated impact resistance, loss of flexibility and poor low-temperature characteristics.

The whitening preventing agent as component d) in the present invention is at least one member selected from ① a mineral oil, a waxe or a paraffin, ② a higher fatty acid or an ester, amide or metallic salt thereof, ③ a silicone, ④ a partial fatty acid ester of a polyhydric alcohol or aliphatic alcohol-, fatty acid-, aliphatic amino-, fatty acid amid-, alkylphenol- or alkyl naphthol-alkylene oxide adduct, and ⑤ a fluoric elastomer.

As examples of the above ① (a mineral oil a waxe or a paraffin) there are mentioned mineral oils such as process oil, waxes such as microwax and polyethylene wax, and paraffins such as liquid paraffin and natural paraffin.

As examples of the above ② (a higher fatty acid or an ester, amide or metallic salt thereof) there are mentioned higher fatty acids such as erucic acid, oleic acid, stearic acid, palmitic acid, linoleic acid, linolenic acid, sorbitan fatty acid, diglycerol fatty acid, pentaerythritol fatty acid, dipentaerythritol fatty acid, and polyoxyethylene fatty acid; higher fatty acid esters such as butyl stearate, stearic acid monoglyceride, oleic acid monoglyceride, 12-hydroxystearic acid, polyoxyethylene(5)-glycerol monostearate, polyoxyethylene(2)glycerol monostearate, and polyoxyethylene(5)monooleate; erucic acid amid, oleic acid amide, stearic acid amide, ethylenehydroxystearamide, methylenebisstearamide, ethylenebisstearamide, and other composite amides.

As examples of metallic salts of higher fatty acids there are mentioned magnesium stearate, zinc stearate, calcium stearate, barium stearate and zinc laurylate.

As examples of the above ③ (a silicone) there are mentioned silicone oils, silicone oligomers, silicone rubbers, and silicone resins. Particularly, silicone oils modified with higher fatty acids are most preferred.

As examples of the above ④ (a partial fatty acid ester of a polyhydric alcohol or aliphatic alcohol-, fatty acid-, aliphatic amino-, fatty acid amide-, alkylphenol- or alkylnaphthol-alkylene oxide adduct) there are mentioned the above fatty acids, sorbitan fatty acid esters such as sorbitan monostearate and sorbitan monopalmitate, glycerol fatty acid esters, diglycerol fatty acid esters, pentaerylthritol fatty acid esters, and fatty acid amides, plus condensates of, fatty example ethylene oxide and propylene oxide added thereto. A suitable number of carbon atoms of these alkylene oxides is in the range of 2 to 4. Suitable addition rates are in the range of 1 to 30 moles in the case of ethylene oxide and 1 to 10 moles in the case of propylene oxide. These may be added each alone or as a mixture, and may be random or block.

As the above ⑤ (a fluoric elastomer) there may be used, for example, a copolymer of vinylidene fluoride with one or more monomers selected from chlorotrifluoroethylene, hexafluoropropylene and tetrafluoroethylene.

The above ① to ④ are particularly effective in preventing flawed whitening out of surface whitenings. Above all, higher fatty acid amides such as oleic acid amide and stearic acid amide as well as silicones such as silicone oils modified with higher fatty acids are preferred. Especially, higher fatty acid amides are inexpensive so advantageous from the economic point of view.

The whitening preventing agent is used in an amount in the range of 0.05 to 20, preferably 0.5 to 5, parts by weight for 100 parts by weight of the resin components. If the amount of the whitening preventing agent is smaller than 0.05 parts by weight, the flawed whitening preventing effect will be unsatisfactory, and if it exceeds 20 parts by weight, not only there will arise the possibility of deterioration in mechanical characteristics such as tensile strength but also the whitening preventing effect will not be improved even with increase of its amount. This is not desirable also in point of cost.

The addition of the component d) not only improves the resistance to flawed whitening but also is effective in improving the acid resistance of the composition.

In the flame-retardant olefins polymer composition of the present invention, as described above, by incorporating the component b) therein, the deterioration of tensile strength which has been a drawback of a conventional flame-retardant compositions containing a large amount of an inorganic flame retardant is prevented and the heat resistance is improved; besides, the melt-dripping of the composition during combustion is prevented. Thus, a high degree of flame retardance was attained by the composition of the present invention. The component d) functions to not only prevent whitening of the composition but also improve the acid resistance of a hydrate of an inorganic metallic compound.

Particularly, when an ethylene-unsaturated carboxylic acid alkyl ester copolymer or an ethylene-vinyl ester copolymer, such as an ethylene-ethyl acrylate copolymer or an ethylene-vinyl acetate copolymer, is used as component a), the resulting composition is good in its acceptability for inorganic compounds, and it is presumed that a coupling effect of the component a) and a hydrate of an inorganic compound as component c) is developed by the addition of an appropriate amount of the modified olefin polymer as component b), thereby permitting the improvement of tensile strength while keeping the deterioration of elongation to a minimum, and that the component d) bleeds out to the surface of the composition to an appropriate extent to form a thin film, thereby preventing whitening and improving the acid resistance.

As to the fluoric elastomer which may be used as component d), if it is used in an extremely small amount to a negligible extent of the evolution of a noxious gas, it is effective in imparting water resistance to the composition, preventing surface whitening, improving the acid resistance of the composition, preventing eye mucus during processing, and improving moldability. The amount of the fluoric elastomer is in the range of 0.01 to 5, preferably 0.02 to 3, more preferably 0.05 to 2, parts by weight relative to the amount of the other components described above.

The composition of the present invention may be used in combination with inorganic fillers, whereby not only the proportion of the flame retardant used can be reduced but also other characteristics can be imparted to the composition.

Examples of such inorganic fillers include calcium sulfate, calcium silicate, clay, diatomaceous earth, talc, alumina, siliceous sand, glass powder, iron oxide, metal powder, graphite, silicon carbide, silicon nitride, silica, boron nitride, aluminum nitride, carbon black, mica, glass plate, sericite, pyrophyllite, aluminum flake, graphite, Shirasu balloon, metal balloon, glass balloon, pumice, glass fiber, carbon fiber, whisker, metallic fiber, graphite fiber, silicon-carbide fiber, asbestos, and wollastonite.

The amount of these inorganic fillers which may be used in the present invention is up to 100 parts by weight for 100 parts by weight of the compositions of the invention. An amount thereof exceeding 100 parts by weight is not desirable because it will cause deterioration in mechanical characteristics such as impact strength of molded products obtained using the composition of the invention.

In the case where the foregoing inorganic flame retardants or the inorganic fillers just exemplified above are used, it is desirable to treat their surfaces, for example, coat them with a fatty acid such as stearic, oleic or palmitic acid, or a metallic salt thereof, paraffin, wax, polyethylene wax, or a modified compound thereof, an oragnosilane, organoborane or organotitanate.

The resin components, flame retardant, flame retarding aid, flawed whitening preventing agent, as well as, if desired, inorganic fillers and additives, are melt-kneaded in a conventional kneading machine such as a Banbury mixer, a pressure kneader, a kneader/extruder, a double-screw extruder, or roll, and thereby pelletized for the supply as moldings or master batch. Alternatively, the resin components may be dry-blended with the flame retardant, flame retarding aid, etc.

In the composition of the present invention there may be incorporated other thermoplastic resins, synthetic and natural rubbers, organic fillers, antioxidants, lubricants, organic and inorganic pigment, as well as such additives as ultraviolet inhibitors, dispersants, copper deactivators, neutralizers, foaming agents, inhibitors, plasticizers, antifoaming agents, weld strength improvers and nucleating agents, according to purposes of use of the composition and as long as they do not impair the effect of the present invention. Also, a crosslinking agent (e.g. an organic peroxide, sulfur, a silane crosslinking agent) and a crosslinking aid may be added to the composition for the introduction of a crosslinked structure therein, or ionizable radioactive rays may be radiated to the composition.

EXAMPLES

The following examples are given, but the present invention is not limited thereto at all.

Resins and Materials used

Component a)

a-1: Ethylene-ethyl acrylate copolymer (EEA, hereinafter) (EA content=15 wt %, MFR=0.75 g/10 min, trade name: Nisseki Rexlon A1150, a product of Nippon Petrochemicals Co., Ltd.)

a-2: Ethylene-vinyl acetate copolymer (EVA, hereinafter) (MFR=1.0 g/10 min, trade name, Nisseki Rexlon V260, a product of Nippon Petrochemicals Co., Ltd.)

a-3: Ethylene-$\alpha$-olefin copolymer (PE, hereinafter) (MFR=1.0 g/10 min, density=0.900, trade name: Nisseki Softrex D9010)

Component b)

Maleic acid-modified ethylene-butene-copolymer (MLLDPE, hereinafter) (trade name: Nisseki N Polymer L6100, a product of Nippon Petrochemicals Co., Ltd.)

Component c)

C-1: Magnesium hydroxide (trade name: Kisuma 5B, a product of Kyowa Kagaku K.K.)

c-2: Aluminum hydroxide (trade name: Higilite 42M, a product of Nippon Light Metal Company, Ltd.)

Component d)

d-1: Oleic acid amid (OA, hereinafter) (a product of Nippon Seiki K.K.

d-2: Erucic acid amid (EA, hereinafter) (a product of Nippon Seika K.K.)

d-3: Carnauba wax (WAX, hereinafter) (a product of Noda Wax K.K.)

d-4: Higher fatty acid-modified silicone oil (MSI, hereinafter) (trade name: TSF410, a product of Toshiba Silicone K.K.)

d-5: Dimethylsilicone oil (Si, hereinafter) (trade name: TSF451, a product of Toshiba Silicone K.K.)

Master batch of a propylene hexafluoride-vinylidene fluoride copolymer dispersed in a linear, low-density polyethylene at a concentration of 1.7%, (FF, hereinafter) (trade name: PA-1700, a product of Polycol Kogyo K.K.)

Testing Method (1) Tensile Strength (UTS) and Elongation (%)

A No. 3 dumbbell specimen from 1 mm thick sheet was measured for tensile strength and elongation at a pulling rate of 200 mm/min using a Tensilon.

(2) Oxygen Index (O.I)

Measured according to JIS K7201.

(3) Flawing Test

A 30×150 mm specimen was prepared from 1 mm thick sheet, then a sapphire stylus of R=0.5 mm was placed upright on the sheet surface, and the sheet was slid at a rate of 2,000 mm/min. The load (g) imposed when the sheet was flawed and became white was used as a flawed point.

(4) Surface Whitening Test

A tubular specimen was suspended in a hermetically sealed 10-liter autoclave charged with 400 c.c of water and containing a gaseous mixture of 99% nitrogen and 1% carbon dioxide. The surface whitening condition of the specimen was observed visually and evaluated after ten days.

1 ... not whitened at all
2 ... shows a sign
3 ... whitened slightly
4 ... whitened
5 ... whitened throughout the whole surface

EXAMPLES 1–20 AND COMPARATIVE EXAMPLES 1–4

The components a), b), c), and d) were dry-blended in the proportions described in Table 1, and melt-kneaded by means of a double-screw extruder to obtain pellets. Then, using the pellets, test were conducted. The results of the tests are as shown in Table 1.

TABLE 1

| | Resin Composition | | | | | | | Physical Properties of Resin Composition | | | | |
|---|---|---|---|---|---|---|---|---|---|---|---|---|
| | Component a) | | Component b) | | Component c) | | Component d) | | MFR g/10 min | UTS kg/cm$^2$ | UEL % | O.I — | Flawed Point g |
| | Kind | Amount wt % | Kind | Amount wt % | Kind | Amount | Kind | Amount wt part | | | | | |
| Example | | | | | | | | | | | | | |
| 1 | EEA | 94 | MLLDPE | 6 | Mg(OH)$_2$ | 120 | OA | 0.5 | 0.31 | 122 | 680 | 29.0 | 400 |
| 2 | EEA | 94 | MLLDPE | 6 | Mg(OH)$_2$ | 120 | OA | 1.0 | 0.36 | 125 | 660 | 28.5 | >700 |
| 3 | EEA | 94 | MLLDPE | 6 | Mg(OH)$_2$ | 120 | OA | 3.0 | 0.43 | 118 | 670 | 28.2 | >700 |
| 4 | EEA | 94 | MLLDPE | 6 | Mg(OH)$_2$ | 110 | OA | 5.0 | 0.56 | 115 | 650 | 27.8 | >700 |
| 5 | EEA | 94 | MLLDPE | 6 | Mg(OH)$_2$ | 120 | Si | 3.0 | 0.36 | 115 | 630 | 34.0 | 500 |
| 6 | EEA | 94 | MLLDPE | 6 | Mg(OH)$_2$ | 120 | MSi | 1.0 | 0.32 | 120 | 630 | 31.0 | 400 |
| 7 | EEA | 94 | MLLDPE | 6 | Mg(OH)$_2$ | 120 | MSi | 3.0 | 0.38 | 117 | 650 | 33.8 | 700 |
| 8 | EEA | 94 | MLLDPE | 6 | Mg(OH)$_2$ | 120 | MSi | 6.0 | 0.37 | 113 | 620 | 37.2 | >700 |
| 9 | EEA | 94 | MLLDPE | 6 | Mg(OH)$_2$ | 120 | WAX | 1.0 | 0.29 | 121 | 610 | 28.8 | 350 |
| 10 | EEA | 94 | MLLDPE | 6 | Mg(OH)$_2$ | 120 | WAX | 6.0 | 0.33 | 116 | 600 | 28.5 | 400 |
| 11 | EEA | 94 | MLLDPE | 6 | Mg(OH)$_2$ | 120 | EA | 2.0 | 0.38 | 121 | 670 | 28.0 | >700 |
| 12 | EEA | 94 | MLLDPE | 6 | Mg(OH)$_2$ | 120 | OA | 2.0 | 0.36 | 115 | 600 | 29.5 | >700 |
| 13 | EEA | 94 | MLLDPE | 6 | Al(OH)$_3$ | 120 | OA | 2.0 | 0.35 | 119 | 670 | 29.2 | >700 |
| 14 | EVA | 94 | MLLDPE | 6 | Mg(OH)$_2$ | 120 | OA | 2.0 | 0.38 | 115 | 650 | 30.2 | >700 |
| 15 | EEA | 96 | MLLDPE | 4 | Mg(OH)$_2$ | 120 | OA | 3.0 | 0.48 | 110 | 650 | 28.2 | >700 |
| 16 | EEA | 90 | MLLDPE | 10 | Mg(OH)$_2$ | 120 | OA | 3.0 | 0.28 | 108 | 580 | 28.2 | >700 |
| Comparative Example | | | | | | | | | | | | | |
| 1 | EEA | 94 | MLLDPE | 6 | Mg(OH)$_2$ | 120 | — | — | 0.32 | 125 | 650 | 29.0 | 200 |
| 2 | EEA | 94 | MLLDPE | 6 | Mg(OH)$_2$ | 120 | OA | 0.03 | 0.27 | 123 | 640 | 29.0 | 200 |
| 3 | EEA | 94 | MLLDPE | 6 | Mg(OH)$_2$ | 120 | OA | 25.0 | 0.33 | 87 | 550 | 24.0 | >700 |
| 4 | EEA | 94 | MLLDPE | 6 | Mg(OH)$_2$ | 120 | MSi | 0.03 | 0.03 | 125 | 650 | 29.2 | 200 |
| Example | | | | | | | | | | | | | Degree of Whitening |
| 17 | EEA | 93 | MLLDPE | 7 | Mg(OH)$_2$ | 125 | F | 0.034 | 0.15 | 103 | 670 | 29.0 | 1 |
| 18 | EVA | 93 | MLLDPE | 7 | Mg(OH)$_2$ | 125 | F | 0.64 | 0.18 | 110 | 660 | 30.0 | 1 |
| 19 | PE | 93 | MLLDPE | 7 | Mg(OH)$_2$ | 125 | F | 3.4 | 0.19 | 115 | 730 | 28.0 | 1 |
| 20 | EEA | 93 | MLLDPE | 7 | Al(OH)$_3$ | 125 | F | 0.64 | 0.17 | 108 | 670 | 29.2 | 1 |

In the flame-retardant olefin polymer composition of the present invention, as set forth above, by blending, as component a), a polyolefin, especially a copolymer of ethylene with an unsaturated carboxylic acid or an ester or metallic salt thereof, e.g. an ethylene-ethyl acrylate copolymer, or an ethylene-vinyl ester copolymer e.g. an ethylene-vinyl acetate copolymer, or an ethylene-α-olefin copolymer, e.g. an ethylene-propylene copolymer, with, as component b), a maleic anhydride-modified linear low-density polyethylene as an olefin polymer modified with an unsaturated carboxylic acid or derivatives thereof, further, as component c), aluminum hydroxide and/or magnesium hydroxide as hydrate(s) of inorganic metallic compound(s), and as component d), a fatty acid amide, a silicone oil, or a fluoric elastomer, the acceptability for the inorganic flame retardant is improved and a synergistic flame retarding effect is enhanced by a coupling effect of the resin components and the inorganic flame retardant, whereby it is made possible to prevent the deterioration of mechanical strength such as tensile strength which has been a drawback of conventional inorganic flame-retardant resin compositions and also possible to improve the heat resistance.

Besides, by the use of component d), the whitening preventing performance and the acid resistance can be improved to a remarkable extent, thus meeting the recent needs.

Further, since the composition of the present invention is superior in electrical characteristics, it can be used as an electrical material such as an electrical insulator or sheath for electric wire or cable, in a crosslinked or uncrosslinked state.

Particularly, the composition of the present invention is suitable for use in places where a high degree of flame retardance is required. For example, it is suitable for cables in various power generation plants, including atomic energy laboratories wherein the amount of corrosive gas is specified, also for cables in chemical, iron and steel and petroleum plants, as well as fire-proof electric wire and general house wiring.

Additionally, the composition of the present invention can be applied to molding use for obtaining extruded or injectionmolded products such as films, sheets and pipes, or can be used as a master batch. It is utilized as panels, packing materials, electric and electronic parts, automobile parts, furniture and household utensils in the fields of fibers, electric and electronic industries, automobiles, ships, aircraft, construction and civil engineering works.

What is claimed is:

1. A flame-retardant olefin polymer composition comprising:
   100 parts by weight of a resin component consisting principally of:
   a) 99–60% by weight of a polyolefin resin, and
   b) 1–40% by weight of an olefin polymer modified with an unsaturated carboxylic acid or a derivative thereof;
   c) 5–200 parts by weight of a flame retardant; and
   d) at least one component selected from the group consisting of:
   ① a mineral oil, a wax, a paraffin,
   ② a higher fatty acid or an ester, amide or metallic salt thereof,
   ③ a silicone
   ④ a partial fatty acid ester of a polyhydric alcohol or aliphatic alcohol-, fatty acid-, aliphatic amino-, fatty acid amide-, alkylphenol- or alkylnaphthol-ethylene oxide adduct, and
   ⑤ a copolymer of vinylidene fluoride with one or more monomers selected from the group consisting of chlorotrifluoroethylene, hexafluoropropylene and tetrafluoroethylene,
   wherein when d) is selected from one or more of components ① to ④ the total amount present is within the range of from 0.5 to 20 parts by weight, when d) is component ⑤ alone the total amount is within the range of from 0.01 to 5 parts by weight and when d) is selected from one or more of components ① to ④ together with components ⑤ the total amount of components ① to ④ is within the range of from 0.5 to 20 parts by weight and the total amount of component ⑤ is within the range of 0.01 to 5 parts by weight.

2. A flame-retardant olefin polymer composition as set forth in claim 1, wherein said polyolefin resin as component a) is at least one ethylene copolymer selected from the group consisting of copolymers of ethylene and unsaturated carboxylic acids or esters or metallic salts thereof, ethylene-vinyl ester copolymers and ethylene-α-olefin copolymers.

3. A flame-retardant olefin polymer composition as set forth in claim 2, wherein said ethylene copolymer is an ethylene-(meth)acrylic acid alkyl ester copolymer, an ethylene-vinyl acetate copolymer, or an ethylene-α-olefin copolymer having a density of 0.86 to 0.91 g/cm$^3$.

4. A flame-retardant olefin polymer composition as set forth in any of claims 1 to 3, wherein olefin polymer modified with an unsaturated carboxylic acid or a derivative thereof as component b) is an ethylene (co)polymer having a density of 0.86 to 0.97 g/cm$^3$.

5. A flame-retardant olefin polymer composition as set forth in any of claims 1 to 2, wherein unsaturated carboxylic acid or derivative thereof is maleic anhydride.

6. A flame-retardant olefin polymer composition as set forth in any of claims 1 to 2, wherein said flame retardant is a hydrated of an inorganic metallic compound.

7. A flame-retardant olefin polymer composition as set forth in claim 6, wherein said hydrate of an inorganic metallic compound comprises aluminum hydroxide and/or magnesium hydroxide.

8. A flame-retardant olefin polymer composition as set forth in any of claims 1 to 2, wherein said component d) is:
   ① a mineral oil, a wax, a paraffin,
   ② a higher fatty acid or an ester, amide of metallic salt thereof,
   ③ a silicone, or
   ④ a partial fatty acid ester of a polyhydric alcohol or aliphatic alcohol-, fatty acid-, aliphatic amino-, fatty acid amide-, alkylphenol- or alkylnaphthol-ethylene oxide adduct.

9. A flame-retardant olefin polymer composition as set forth in any of claims 1 to 3 wherein said component d) is a copolymer of vinylidene fluoride with one or more monomers selected from the group consisting of chlorotrifluoroethylene, hexafluoropropylene and tetrafluoroethylene.

10. A flame-retardant olefin polymer composition comprising:
    100 parts by weight of a resin component principally of:
    a) 99–60% by weight of a polyolefin resin, and
    b) 1–40% by weight of an olefin polymer modified with an unsaturated carboxylic acid or a derivative thereof;
    c) 5–200 parts by weight of a flame retardant; and
    d) at least one component selected from the group consisting of:
    (i) a mineral oil, a wax, a paraffin,
    (ii) a higher fatty acid or an ester, amide or metallic salt thereof,
    (iii) a silicone; and
    (iv) a partial fatty acid ester of a polyhydric alcohol or aliphatic alcohol-, fatty acid-, aliphatic amino-, fatty acid amide-, alkylphenol- or alkylnaphthol-ethylene oxide adduct,
    wherein the total amount of components (i)–(iv) present is within the range of from 0.5 to 6 parts by weight.

11. A flame-retardant olefin polymer composition comprising:
   100 parts by weight of a resin component consisting principally of:
   a) 99–60% by weight of a polyolefin resin, and
   b) 1–40% by weight of an olefin polymer modified with an unsaturated carboxylic acid or a derivative thereof;
   c) 5–200 parts by weight of a flame retardant; and
   d) a copolymer of vinylidene fluoride with one or more monomers selected from the group consisting of chlorotrifluoroethylene, hexafluoropropylene and tetrafluoroethylene,
   wherein the amount of d) is within the range of 0.01 to 5 parts by weight.

12. A flame-retardant olefin polymer composition comprising:
   100 parts by weight of a resin component consisting principally of:
   a) 99–60% by weight of a polyolefin resin, and
   b) 1–40% by weight of an olefin polymer modified with an unsaturated carboxylic acid or a derivative thereof;
   c) 5–200 parts by weight of a flame retardant;
   d) a copolymer of vinylidene fluoride with one or more monomers selected from the group consisting of chlorotrifluoroethylene, hexafluoropropylene and tetrafluoroethylene; and
   e) at least one component selected from the group consisting of:
      (i) a mineral oil, a wax, a paraffin,
      (ii) a higher fatty acid or an ester, amide or metallic salt thereof,
      (iii) a silicone
      (iv) a partial fatty acid ester of a polyhydric alcohol or aliphatic alcohol-, fatty acid-, aliphatic amino-, fatty acid amide-, alkylphenol- or alkylnaphthol-ethylene oxide adduct, and
   wherein the total amount of components (i) to (iv) is within the range of from 0.5 to 20 parts by weight and the total amount of component d) is within the range of 0.01 to 5 parts by weight.

13. A flame-retardant olefin polymer composition as in claim 1 wherein the total amount of components ① to ④ is within the range of from 0.5 to 6 parts.

14. A flame-retardant olefin polymer composition as in claim 12 wherein the total amount of components (i) to (iv) is within the range of from 0.5 to 6 parts by weight.

* * * * *